INVENTORS
Giovanni Hilgers
Gerhard Hitzemann
Achim Kulling

United States Patent Office 3,694,168
Patented Sept. 26, 1972

3,694,168
MEANS FOR PRODUCING PYROGENIC TITANIUM DIOXIDE PIGMENT
Giovanni Hilgers, Hau Post Bechen, Gerhard Hitzemann, Giershofen, Post Dierdorf, and Achim Kulling, Opladen, Germany, assignors to Titangesellschaft mbH, Leverkusen, Germany
Original application Feb. 12, 1968, Ser. No. 704,895, now Patent No. 3,512,933, dated May 19, 1970. Divided and this application Jan. 28, 1970, Ser. No. 6,384
Claims priority, application Germany, Mar. 6, 1967, T 33,354
Int. Cl. C01g 23/04; F22d 11/04
U.S. Cl. 23—284   4 Claims

ABSTRACT OF THE DISCLOSURE

Means for producing pyrogenic titanium dioxide by reaction of gaseous titanium tetrachloride and oxygen in the presence of hot combustion gases produced by the combustion of carbon monoxide the reaction of the several gases being initiated by feeding the several gases from a tubular burner assembly into contact with a rotating relatively cold body within the reaction chamber said cold body rotating at speeds at least 50 times terrestial acceleration whereby the several gases are thoroughly mixed at reaction and the $TiO_2$ reaction product precluded from adhering to surfaces of the burner assembly.

---

This is a division of application Ser. No. 704,895 filed Feb. 12, 1968 and issued as U.S. Pat. No. 3,512,933, May 19, 1970.

BACKGROUND OF THE INVENTION

In general pyrogenic titanium dioxide pigment is produced by the reaction of titanium tetrachloride with oxygen, or a gas containing oxygen, in the presence of hot combustion gases of an auxiliary flame produced by the combustion of carbon monoxide. These gases are brought together for reaction in a reaction chamber by means of a burner assembly typical of which is a concentric tube burner wherein the titanium tetrachloride is fed through a central tube surrounded by one or more additional concentrically arranged tubes for the other reactants. The gas mixture produced by the reaction, hereinafter referred to as the reaction product gases, is subsequently cooled whereupon separation of the titanium dioxide therefrom is carried out in a suitable manner.

It has been found that in a reaction of extended duration deposits of titanium dioxide are frequently formed at the exit ends of the burner tubes, i.e., the burner mouth. These deposits cause, at first, disturbances of the flame and thereby impairment of the quality of the reaction product; and subsequently will clog the burner to such an extent that the combustion is stopped.

Frequent attempts have been made to avoid deposit formation at the burner mouth. It has been proposed to give a spiral motion to at least one of the gas currents (Swiss Pat. No. 276,037); other suggestions are concerned with the formation of an intermediate layer of inert gases between the reactants at the exit ends of the burner tubes (British Pat. No. 535,214); the use of a largely water-free gas current in proximity to a gas mixture containing titanium tetrachloride and oxygen (German Pat. No. 948,415); the regulation of the exit velocity and the temperature at the mouth of the burner tubes (German Pat. No. 947,788); cooling of the tube mouths (Canadian Pat. No. 502,045); application of laminar current (Dutch patent application No. 6509025) or the use of specially formed burners which are supposed to effect a turbulent mixing of the reactants (Dutch patent application No. 6412529). All these expedients have disadvantages. Either the procedure is not sufficiently effective or a pigment with inadequate rutile content is obtained; also it may be difficult to control the reaction or else there are disadvantages in the further use of the reaction product gases for chlorination owing particularly to their dilution with inert gases.

In addition to the foregoing there is also a concentric tube burner characterized in that the outer burner tube is extended beyond the ends of the other feed tubes and provided with a construction at its exit end (German Pat. No. 1,197,440). The employment of this burner prevents to a large extent the formation of titanium dioxide deposits at the burner mouth and a rutile pigment having very good properties is thereby obtained. However, for the production of such a pigment a rather long chamber is required and since this chamber has a correspondingly large wall surface on which titanium dioxide deposits may form, it is necessary to take extensive precautions in order to keep it free of deposits. Moreover, rutile pigments extremely low in anatase, such as are required for some purposes, cannot be manufactured successfully by this process, unless special precautions are taken in cooling the reaction product gases.

A further disadvantage of known processes is seen in the fact that the cross-sections of the burners must not exceed a certain size. If this cross-section is too large, a very long flame with unequal temperature distribution is formed and since the length of the reaction chamber is determined by the spot where the last fractions of the starting materials react with each other, the reaction chamber must have a correspondingly long length. As a consequence the individual titanium dioxide particles are subjected to varying residence times at varying temperatures from which it follows that some of the titanium dioxide formed is over-calcined. The product obtained in this way is non-uniform and has inferior pigmentary characteristics. This limitation in the cross sectional area of the burners thus entails a limitation in the capacity of the burners known to date so that larger throughputs of titanium tetrachloride have been obtained only by using a multiplicity of individual burners; or alternatively, the current of gaseous titanium tetrachloride has been divided into a multiplicity of smaller currents spaced uniformly over a burner assembly of relatively large cross-section. The devices needed for this purpose are, however, complicated, prone to disturbances and their operation is difficult to control. The process according to the present invention offers the possibility of surmounting these difficulties.

SUMMARY OF THE INVENTION

The present invention is the discovery of an improved process and means for the manufacture of finely divided titanium dioxide by the reaction of titanium tetrachloride with oxygen or a gas containing oxygen in the presence of hot combustion gases formed by an auxiliary flame wherein titanium tetrachloride, oxygen or gas containing oxygen and carbon monoxide are introduced into a chamber by means of a concentric tubular burner assembly the improvement being characterized by the fact that the mixing, or the beginning of the reaction between the gaseous titanium tetrachloride and oxygen, occurs upon contact of the gases with a preferably cool rotary body rotating at centrifugal accelerations of at least 50 times terrestial acceleration.

Using the improvement of this invention, deposit formation at the burner mouth is practically completely eliminated since, on the one hand, the reactants, especially the gasoeus titanium tetrachloride, are deviated away from the burner mouth by centrifugal forces and, on the other hand, any titanium dioxide particles possibly reaching the rotating body are flung off again by the centrifugal forces. Furthermore, by contact of the gaseous titanium tetrachloride with the rotary body the former is moved turbulently into the gas current containing oxygen and distributed very uniformly throughout the entire surrounding reaction zone. Thus a very fast and thorough mixing of the reactants takes place in a relatively small space where the reaction proceeds rapidly whereby a very uniform product is obtained. Consequently the reaction chamber may be shortened whereby the removal or avoidance of titanium dioxide deposits on the chamber wall is facilitated and, if so desired, a rutile pigment with very slight anatase content may be obtained easily and without special precautions in the cooling of the reaction mixture.

In one suitable embodiment of the apparatus for carrying out the process according to the invention the rotary body is confined within the reaction chamber to the zone of reaction of the titanium tetrachloride with the oxygen. In an advantageous modification of the apparatus for carrying out this invention the rotary body is extended by a cylindrical sleeve attached thereto which forms a ring-shaped reaction zone bounded by the rotary sleeve and the reaction chamber wall. This arrangement makes it possible to enlarge the burner and the cross-section of the reaction chamber, as desired, without increasing the distances within the reaction zone so that even with relatively large burners an intensive and thorough mixing of the titanium tetrachloride with the other reactants is achieved. Owing to the ring-shaped form of the reaction zone and the thorough mixing of the reactants, no long flames occur even with burners of large cross-section. Thus a very large amount of titanium tetrachloride may be successfully reacted in a unit of time by a single burner suitably dimensioned.

The reaction of the carbon monoxide and the gaseous titanium tetrachloride with oxygen may occur in the same zone within the reaction chamber. It was found, however, to be often expedient to burn the carbon monoxide first with excess oxygen and then introduce the gaseous titanium tetrachloride into the hot gas combustion mixture thus formed.

Concerning the titanium tetrachloride feed and its contact with the rotary body, the gaseous titanium tetrachloride may be fed either outside along the outer surface of the rotary body or else it may be introduced into the rotary body and be expelled therefrom into the reaction chamber through one or more radial side-openings in the rotary body. It is often of advantage to cool the rotary body. An uncooled rotary body may be seriously attacked by the hot reactants under certain conditions. Also, any titanium dioxide striking the rotary body will adhere the less to a colder surface than to a hotter one and hence a lower number of revolutions per minute is sufficient to throw off adhering titanium dioxide from a colder rotary body than from a hotter one.

Cooling the rotary body may be done in any desired manner, i.e., from the outside and/or from the inside. For example, the gaseous titanium tetrachloride may itself serve as cooling agent either by feeding it into contact with the outside of the rotary body or by feeding it inside the rotary body before discharging the tetrachloride into the reaction zone. The employment of the gaseous titanium tetrachloride as cooling agent has the additional advantage that no dilution of the reaction product gases occurs. Incidentally when the rotary body is a hollow member it is expedient to cool it from the inside by feeding a cooling agent through it. The cooling agent may conveniently be the same cooling gas used for cooling the titanium dioxide burdened reaction product gases by first feeding this cooling gas into the rotary body and from thence into the reaction product gases surrounding the lower end of the rotary body. The cooling gas issuing from the rotary body is mixed intensely and uniformly with the reaction product gases owing to the centrifugal action of the rotary body and thus provides rapid cooling. In addition the cooling gas cools the rotary body. The reaction product gas, cooled and freed from titanium dioxide, is particularly suitable as cooling gas.

In order to avoid or reduce titanium dioxide deposits on the well of the chamber, any desired known procedure may be applied. For example, the chamber wall may be exposed to a tangentially introduced current of inert gas.

The efficiency of the process according to the invention depends on the number of revolutions per minute (r.p.m.) of the rotary body. The optimum r.p.m. depends on the shape of the rotary body, the temperature at the surface of the rotary body and the throughput of the gaseous reactants. The greater the r.p.m. is the smaller is the formation of titanium dioxide deposits at the burner mouth and the better is the thorough mixing of the gaseous titanium tetrachloride with the other reactants. With a cooled rotary body of about 30 mm. diameter and rotating at 3000 r.p.m. substantially no deposit formation takes place. In this connection it has been found that with a cold surface a centrifugal acceleration of at least 50 times terrestrial acceleration is necessary to preclude deposit formation while if the surface of the rotary body is hot then at least 100–150 times terrestrial acceleration is generally necessary.

However, it is generally expedient to employ rotational speeds higher than 3000 r.p.m. since then a more thorough mixing of the titanium tetrachloride with the other reactants is promoted. For example, centrifugal accelerations of about 800–1000 times terrestrial accelerations are favorable and will be reached, for example, at the circumference of a rotary body having a diameter of 100 mm. by rotating the latter at 4000 r.p.m.

In practicing the improved process of this invention substances that improve the pigment characteristics in a manner known as such, e.g., aluminum chloride and/or silicon tetrachloride, may be added to the reaction. Furthermore, the type and manner, whether and how high the gaseous reactants and/or the carbon monoxide are preheated are selective within wide limits.

PREFERRED EMBODIMENT OF THE INVENTION

Figure 1:
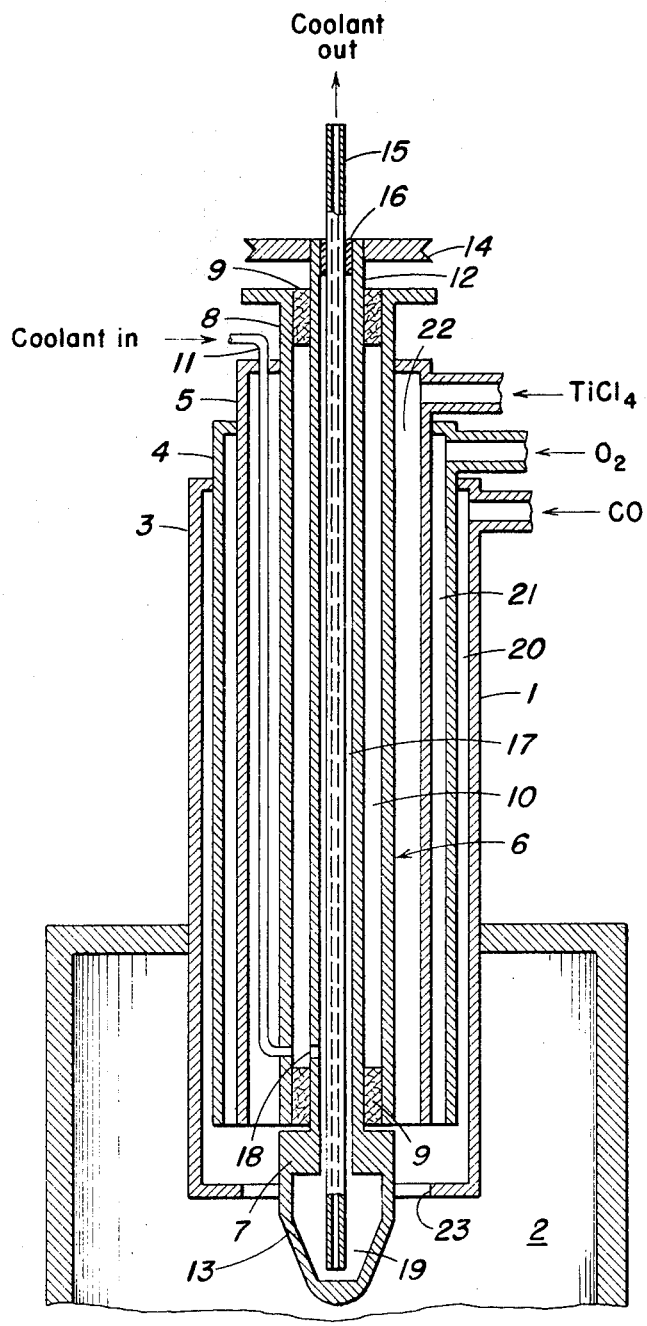
FIG. 1 is a schematic vertical elevation in section of the improved concentric tube burner assembly of this invention wherein the cooled rotary body comprises a hollow nose supported on the lower end of a tubular shaft rotatably mounted in the burner assembly coaxial therewith.

The improved process of the invention may be carried out in various ways using the several different burner assemblies disclosed in the drawings one of the preferred burner assemblies being that shown in FIG. 1. In this embodiment of the invention the burner assembly, indicated generally at 1, is mounted in the upper end of a reaction chamber 2 and comprises three coaxially arranged feed tubes 3, 4 and 5. In the center of the burner assembly a tubular casing 6 is mounted for rotatably supporting the rotary body 7. To this end the casing 6 comprises a tube 8 having packings 9—9 at each end which serve as bearings for the shaft 12 of the rotary body with an annular space 10 being left between the shaft 12 and the tube 8. A feeding tube 11 for a cooling medium enters this annular space 10 adjacent the bottom of the casing 6. The rotary body 7 is carried on the lower end of a hollow shaft 12 rotatably mounted within the casing 6 and, in one embodiment, comprises a hollow broadened nose 13 which projects partly into the reaction chamber 2. The shaft 12 of the rotary body is connected by a belt and pulley drive, indicated generally by pulley 14 to a power source (not shown). Within the hollow shaft 12 a coolant tube 15 is mounted which is supported at its upper end by packing 16 within the shaft 12 of the rotary body and extends into the hollow-nose 13. The interior 17 of the hollow shaft 12 is connected by one or more openings 18 with the annular space 10 within the casing 6. In order to cool the casing 6 and the rotary body 7 a cooling medium flows through the inlet tube 11 into the annular space 10 and from thence through the opening or openings 18 into the interior 17 of the hollow shaft 12. From here it flows into the space 19 within the hollow-nose 13 of the rotary body from whence it is withdrawn through exhaust tube 15.

The concentric tubes 3, 4, and 5 and coaxially mounted casing 6 form intermediary spaces 20, 21 and 22 through which the gaseous reactants are fed. The outermost tube 3 is extended beyond the ends of the tubes 4 and 5 and casing 6 and is constricted at its end. TiCl$_4$ is fed through the interspace 22 and the other reactants, i.e., the oxygen or the gas containing oxygen and the carbon monoxide are introduced through the interspaces 20 and 21.

The burner assembly described above may be modified in various ways. The rotary body 7 may have various forms, for example, the form of a disc of varying cross-section, a cylinder, a wheel with spokes, etc. Also the rotary body may be made solid in which case cooling is provided from the outside by a suitable coolant. Further, the end of the tube 3 need not be extended and the burner mouth need not be constricted. The constriction may have another shape. The endpiece of tube 3 may also be made with a double wall and may then be cooled from the inside.

Figure 2:
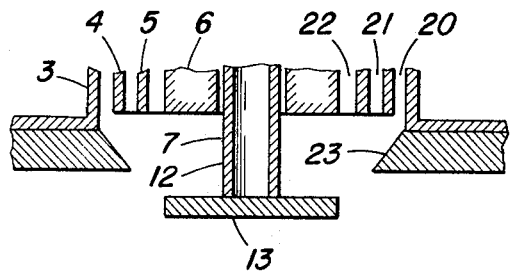
FIG. 2 is a schematic fragmentary vertical elevation in section of a modified form of concentric tube burner including a cooled rotary body in the shape of a flat disc.

FIG. 2 shows another suitable form of the burner assembly in a partial view. The burner consists again of concentrically arranged tubes 3, 4 and 5 as well as the casing 6 the construction of which is not shown in detail here. In the casing 6 is mounted shaft 12 which is extended beyond the end of tubes 3, 4 and 5 and the casing 6 and provided at its extremity with a rotary body in the shape of a disc 13. The mouth of the burner is constricted by fixing an apertured plate 23 on the end of the tube 3 the wall of the opening in the apertured plate being bevelled in the shape of a truncated cone so that the burner mouth is gradually narrowed from top to bottom.

Figure 3:
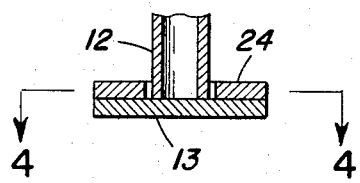
FIG. 3 is a schematic fragmentary vertical elevation in section of a cooled rotary body in the form of a ribbed disc.
Figure 4:
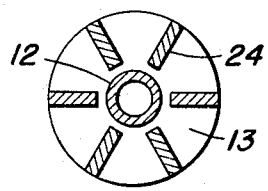
FIG. 4 is a top plan view of the ribbed disc on line 4—4 of FIG. 3.

The titanium tetrachloride is fed through the interspace 22 and from there comes into contact with the disc 13 while the other reactants are introduced through the interspaces 20 and 21. In FIGS. 3 and 4 there is shown a modification of the disc-type body 13 of FIG. 2, wherein a number of ribs 24 are applied to the upper side of the disc. These ribs increase the turbulent mixing of the titanium tetrachloride with the other gaseous reactants.

The ribs may also have another shape than that shown in FIGS. 3 and 4; the may, for example, be higher than wide, and need not, on the other hand, cover the whole width of the disc. Also ribs of varying shape may be employed simultaneously. The underside and/or the circumference of the disc 13 may be fitted likewise with ribs.

Figure 5:
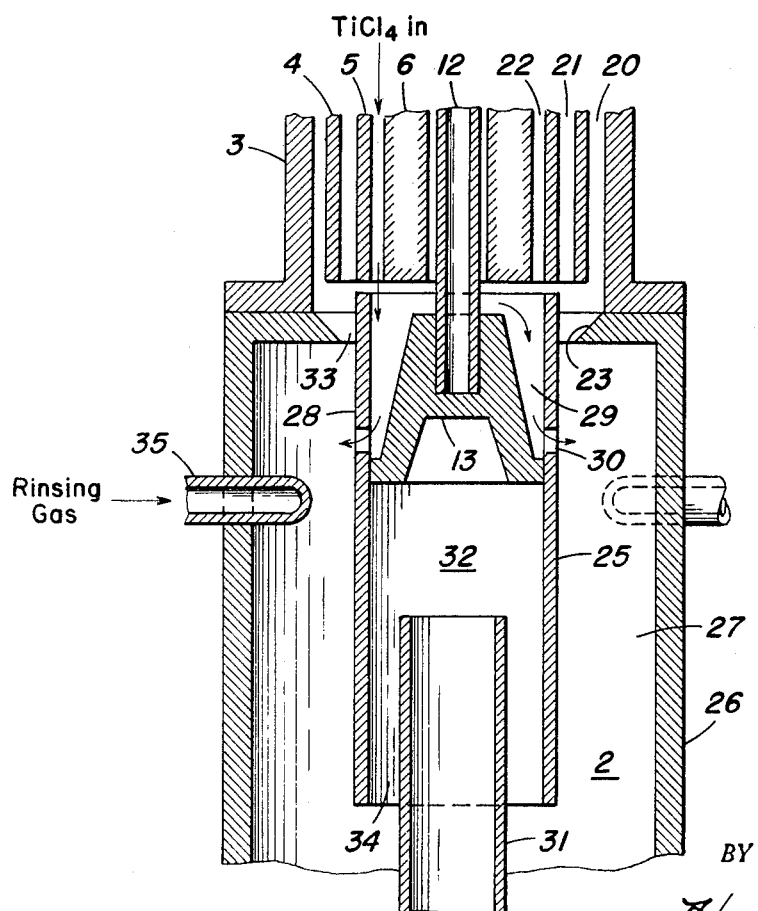
FIG. 5 is a schematic fragmentary vertical elevation, in section, of a modified form of concentric tube burner assembly wherein the cooled rotary body comprises a truncated cone-shaped member carrying a cylindrical sleeve telescoped thereover which sleeve forms a ring-shaped reaction zone with the surrounding wall of the reaction chamber.

FIG. 5 shows another suitable burner assembly. In this burner the rotary body is in the form of a truncated cone the surface of which has been extended by an attached piece 25 in the shape of a hollow cylinder which forms a ring-saped reaction space 27 between the sleeve 25 and the chamber wall 26.

The cylindrical sleeve 25 is extended upwardly beyond the truncated cone as indicated at 28 and terminates directly below the burner tube 5 thus surrounding the part of the truncated cone immediately below the burner tubes. A chamber 29 is thus formed between the truncated cone and the extension 28 of the cylindrical sleeve.

Immediately above the point of attachment of the truncated cone with the cylindrical sleeve one or more openings 30 penetrate the sleeve 28 and thereby form passages between the chamber 29 and the aforesaid reaction space 27. From below a tube 31 projects up into a chamber 32 enclosed by the lower end of the sleeve 25. The titanium tetrachloride is passed through the interspace 22 within feed tube 5 of the burner and from there passes into chamber 29. Here it serves for cooling the hollow cylinder 28. Subsequently it is blown through the openings 30 into the reaction space 27. The other gaseous reactants are fed through the interspaces 20 and 21 of the burner and then pass through an annular opening 33 into the reaction space 27. The annular opening 33 may be narrowed, if desired, by an annular restricted aperture 23.

Immediately upon entering into the reaction space 27 an intensive mixture of the oxygen or the gas containing oxygen with the carbon monoxide takes place whereupon reaction with the formation of the auxiliary flame and hot combustion gases starts. The mixing is additionally promoted by narrowing of the bolt 33. The titanium tetrachloride is blown into the hot combustion gases by means of centrifugal forces imparted to the gaseous TiCl$_4$ by the rotary body and it is turbulently and intensively mixed with the hot combustion gases so that the reaction proceeds rapidly and uniformly.

An inert cooling gas is blown into the chamber 32 through tube 31 which gas serves first for cooling the sleeve 25; and then enters via the annular slot 34 formed between the tube 31 and the sleeve 25 into the reaction chamber 2 and serves there for the cooling of the reaction mixture. Rinsing gas may be introduced through one or more tangential tube 35 in order to maintain the chamber wall 26 free of deposits.

Figure 6:
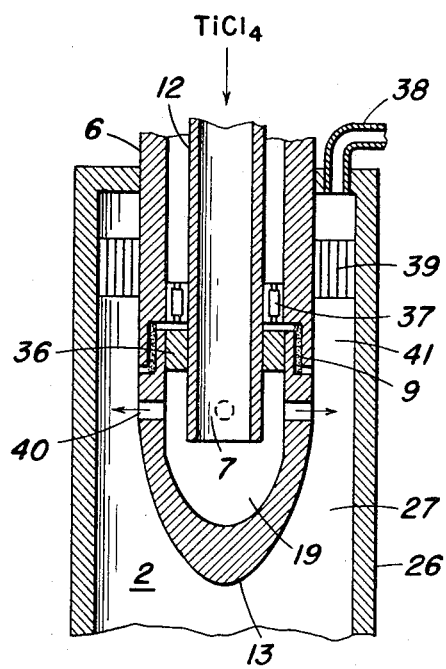
FIG. 6 is a schematic fragmentary vertical elevation, in section, of a modified burner assembly wherein the cooled rotary body comprises a hollow nose carried on the lower end of the $TiCl_4$ feed tube, the latter being rotatably mounted in a bearing secured in the upper end of the reaction chamber.

Another suitable burner assembly is shown in FIG. 6. In this embodiment of the invention the rotary body 7 comprises a hollow nose 13 supported in the reaction chamber by a hollow shaft 12 to which it is connected by a bushing 36. The hollow shaft 12 is surrounded by a casing 6 in which the shaft is mounted on bearings 37. Suitable packing 9 is provided between the casing 16 and the rotatable nose 13. The casing 6 is placed within a reaction chamber 2. This reaction chamber has at its upper end one or more feeding tubes 38 as well as burner arrangements 39. The nose 13 has a hollow space 19 into which the lower end of hollow shaft 12 extends. Furthermore, the hollow nose has one or more radial opening 40 so that there is a connection between the hollow space 19 in the nose and the reaction space 27.

A gas mixture is passed through the feeding tube, the tubes 38 into the upper part of the reaction chamber 2 and from thence through the burner arrangements 39, which gas mixture contains oxygen and carbon monoxide. Below the burner arrangements 39 a reaction takes place in the combustion zone 41 with the formation of an auxiliary flame and hot combustion gases. Titanium tetrachloride is passed through the hollow shaft 12 into the hollow space 19 in the nose 13 where it serves first for cooling the hollow nose 13 and is then blown through the opening or openings 40 into the reaction space 27.

Immediately after leaving the opening or openings 40 an intensive fine distribution, mixing and reaction of the titanium tetrachloride with the hot oxygen containing combustion gases is produced by the rapid movement of the rotary body. After reaction the reaction product gases are drawn off towards the bottom and cooled and further processed in the customary manner. To keep the chamber wall 26 free, rinsing gas may be introduced through tangential feeding tubes (not shown).

Figure 7:
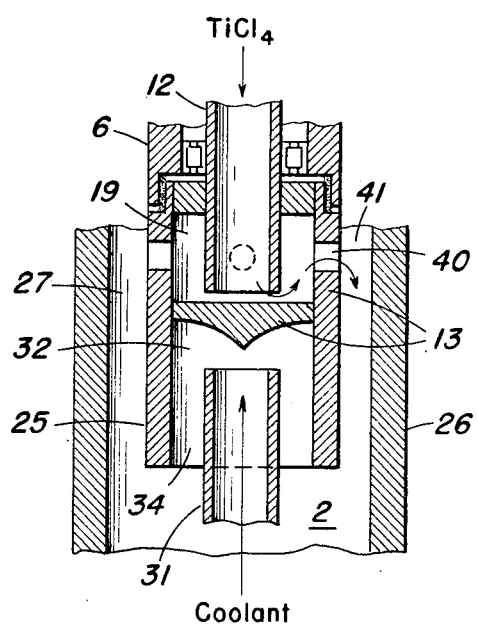
FIG. 7 is a schematic fragmentary vertical elevation in section of the type of burner assembly shown in FIG. 6 but with a cooled rotary body in the form of a cylindrical sleeve divided into upper and lower chambers.

FIG. 7 shows, in part, a modification of the burner assembly shown in FIG. 6. In this device the rotary body is in the form of a cylindrical sleeve 13 divided into upper and lower chambers and providing an extension 25 similar to that shown in FIG. 5 so that the reaction space 27 delineated by the sleeve extension 25 and the chamber wall 26 is ring-shaped. A tube 31 projects upwardly from below into the lower chamber 32. Titanium tetrachloride is conveyed through the hollow shaft 12 into the upper chamber 19 in the sleeve 13 and serves here first for cooling the sleeve 13 and is then blown through one or more radial openings 40 into the reaction space 27 where it is mixed by rotation of the sleeve 13 with the hot oxygen containing combustion gas which derives from an auxiliary flame burning in the combustion zone 41. The feeding tubes of the other gases and the burner arrangements for the auxiliary flame correspond to those in the device shown in FIG. 6 and are not shown in FIG. 7.

In order to cool the reaction mixture an inert cooling gas is conveyed from below through tube 31 similar to the arrangement shown in FIG. 5, which gas cools first the sleeve extension 25 and then passes through the annular opening 34 into the chamber 2 and there cools the hot reaction mixture.

The shape of the reaction space 27 may be modified within wide limits by varying the form of the rotary body 7 and, as the case may be, that of its extension 25. For example, due to the tapered shape of the hollow nose 13 (FIG. 6) the reaction space has a cross-section increasing from the top downward which, under certain conditions, is an advantage owing to the volume increase starting at the reaction. On the other hand, this arrangement may have a disadvantage in that turbulent flow may arise at the tip of the tapered nose 13 which has an unfavorable effect on the control of the reaction. This turbulence may be avoided by providing the cylindrical sleeve arrangement shown in FIGS. 5 and 7.

The openings 30 and 40 may have different shapes; they may, for example, be circular or slot-shaped and they may be arranged in one or several rows.

In the following examples, which will serve to explain the invention in more detail, the pigments obtained were subjected to the following tests:

Test for anatase

The anatase content was determined by X-ray.

Test for tinting strength

Tinting strength was determined according to the following standardized laboratory method: A carbon black mixture was prepared from 5.6 g. carbon black and 1550 g. precipitated calcium carbonate. With 1.0 g. of this carbon black mixture and a definite amount of the pigment to be tested a sample paste was made with 0.425 g. linseed oil. Besides that a standard paste from 1.0 g. of the carbon black mixture, a definite amount of a standard paste pigment and 0.425 g. linseed oil was made. The sample paste and the standard paste were coated side by side on a slide and the coatings were compared visually at the back of it. If the sample paste was lighter, a new sample paste with a smaller amount of pigment was made; if, on the other hand, the standard paste was lighter, a new sample paste with a larger amount of pigment was prepared. The amount of pigment to be investigated was varied until the brightness of the sample paste equalled that of the standard paste. As numerical value of the tinting strength a hundred times the reciprocal value of the weight of the pigment sample in grams was taken for the sample paste which had the same brightness as the standard paste. The greater this numerical value is, the better is the tinting strength of the pigment.

In the following examples, oxygen was used with titanium tetrachloride and carbon monoxide. The titanium tetrachloride was heated to 300° C. and the oxygen to 250° C. The carbon monoxide was at room temperature. In Example 4 a carbon monoxide-oxygen mixture of room temperature was employed.

EXAMPLE 1

A burner assembly such as shown in FIG. 2 was employed. The tubes 3, 4 and 5 had an O.D. of 133 mm., 117 mm. and 102 mm. and thickness of 4 mm., 2 mm., and 3 mm. respectively. The tubular bearing casing 6 had an O.D. of 76 mm. The aperture 23 narrowed the mouth of the burner to a diameter of 105 mm. at a distance of 19 mm. from the tube mouths. The shaft 12 was spaced 15 mm. from the tubular bearing casing 6, and supported a rotary body in the form of a circular disc 13 having a diameter of 76 mm.

The burner assembly opened into a cylindrical chamber 2 which had a diameter of 220 mm. and a length of 600 mm.

Through the interspace 22 were fed 500 standard kg. per hour gaseous titanium tetrachloride to which had been added 2.9% aluminum chloride, calculated as oxide on a $TiO_2$ weight basis; through the interspace 21 were fed 94 standard cu. m. per hr. oxygen and through interspace 20 were fed 38 standard cu. m. per hour carbon monoxide. The gases were brought to reaction in the reaction chamber 2. The disc 13 was rotated at 1500 r.p.m. The wall of the reaction chamber 2 was cleaned by a tangential gas current and thereby kept free of deposits.

The reaction proceeded trouble-free even after 20 hours; the burner mouth and the disc 13 were free of deposits. The pigment had a tinting strength of 1850 and an anatase content of 0.6%.

EXAMPLE 2

A burner assembly according to FIG. 2 was employed having a rotary body like that shown in FIGS. 3 and 4. Its diameter was 76 mm. and on its upper side 6 ribs 5 mm. high were attached extending from the axis to the edge of the disc. The cylindrical chamber 2 had a length of 400 mm. and a diameter of 220 mm.

Through interspace 22 were fed 500 standard kg. per hour titanium tetrachloride and aluminum chloride corresponding to 2.9% $Al_2O_3$, on a pigment weight basis; through interspace 21 were fed 94 standard cu. m. per hour oxygen, and through interspace 20 were fed 38 standard cu. m. per hour carbon monoxide. The gases were brought to reaction in the reaction chamber 2. The rotary body made 3000 r.p.m. The wall of the reaction chamber was again kept free of deposits by a tangential gas current.

After the experimental period of 7 hours no deposits could be observed at the burner mouth or on the rotary body. The pigment had a tinting strength of 1850 and an anatase content of 0.6%.

When the reaction was carried out with the same amounts of titanium tetrachloride, aluminum chloride, oxygen and carbon monoxide as in Examples 1 and 2 but with the aid of a burner such as described in German Pat. No. 1,197,440 here also no appreciable deposits at the burner mouth were obtained, but it was necesssary to extend the length of the chamber to 800 mm. in order to get a good pigment (tinting strength 1800, anatase content 1.4%). The greater length of the chamber and, therefore, the larger surface of the chamber wall required more work and expense to keep the chamber wall free of deposits.

EXAMPLE 3

A burner assembly according to FIG. 5 was employed. The tubes 3, 4 and 5 and the tubular bearing casing 6 had the same dimensions as in the devices described in Examples 1 and 2. By means of the restricted aperture 23 the burner mouth was narrowed to a diameter of 115 mm., 19 mm. below the ends of the tubes 4 and 5. A cyclindrical sleeve 220 mm. length and having an O.D. of 96 mm. was secured on the truncated cone shaped rotary body 13. The length of the lower part of the sleeve, corresponding to the extension 25, was 150 mm. and the length of the upper part 28 of the sleeve was 70 mm. 60 mm. below the upper end of the sleeve several openings 30 with a diameter of 10 mm. were provided in the wall of the sleeve. A pipe 31 with an O.D. of 70 mm. projected from below up into the chamber 32 enclosed by the sleeve extension 25. The bearing casing 6 and the shaft 12 were cooled from the inside similarly as in FIG. 1.

The chamber 2 had an inner diameter of 220 mm. The ring-shaped reaction space 27 had a length of 160 mm. fixed by the distance between the openings 30 and the lower edge of the sleeve extension 25. The rotary body ran at 3000 r.p.m.

Through the interspace 22 300 standard kg. per hour titanium tetrachloride with an aluminum chloride content corresponding to 2.8% $Al_2O_3$ on the basis of pigment were introduced into the hallow space 29 and from there passed through the openings 30 into the reaction space 27. Simultaneously 78 standard cu. m. per hour oxygen were conveyed through interspace 21 and 38 standard cu. m. per hour carbon monoxide through interspace 20 and reacted with the formation of hot compustion gases.

The wall of chamber 2 was kept free of titanium dioxide deposits by means of tangentially introduced gas.

In order to quench the hot reaction product gases 200 standard cu. m. per hour of reaction product gas that had been freed of titanium dioxide and cooled to room temperature was introduced through pipe 31.

The reaction ran to completion. The burner mouth was free of titanium dioxide deposits. The product obtained had a tinting strength of 1850 and an anatase content of 1.3%.

EXAMPLE 4

A burner assembly according to FIG. 7 was employed. The chamber 2 had an inner diameter of 300 mm. From above a feeding tube 38 opened eccentrically into the chamber 2. The burner arrangement 39 was 30 mm. below the upper end of the chamber 2.

The rotary body 13 comprised a cylindrical sleeve having an O.D. of 120 mm. and was divided into upper and lower chambers the former having a length of 32 mm. and the latter a length of 240 mm. the bearing casing 6 having the same O.D. as the cylindrically-shaped rotary body. At the side wall of the rotary body 13 were several openings 40, each with a cross-section area of 40 sq. mm. A pipe 31 with an O.D. of 88 mm. projected from below into the lower chamber 32. The bearing casing 6 was cooled from the inside. The length of the reaction zone determined by the distance between the openings 40 and the lower edge of the extension 25 was 250 mm.

A mixture of 90 standard cu. m. per hour oxygen and 30 standard cu. m. per hour carbon monoxide was introduced through the pipe 38 and ignited to form an auxiliary flame behind the burner arrangements 39 in the combustion zone 41. Through the hollow shaft 12 300 standard kg. per hour titanium tetrachloride and 3.2% aluminum chloride, calculated as $Al_2O_3$ on the basis of pigment formed, were introduced. They passed first into the upper chamber 19 and from thence through the openings 40 into the hot combustion gases of the auxiliary flame. The wall 26 of the chamber 2 was kept free of titanium dioxide deposits by a tangentially introduced gas current. In order to cool the extension 25 and the reaction product gases containing titanium dioxide, 200 standard cu. m. per hour reaction product gas freed from titanium dioxide and cooled to room temperature were introduced through pipe 31 that passed first into the hollow chamber 32 and from there through the annular slot 34 into the chamber 2 where the reaction product gas was cooled. The reaction product gas was then drawn off in the known manner and processed further. The reaction was complete. The pigment obtained had a tinting strength of 1850 and an anatase content of 0.6%.

While this inevntion has been described and illustrated by the examples shown, it is not intended to be strictly limited thereto and other variations and modifications may be employed within the scope of the following claims.

We claim:

1. In a multiple concentric tube burner assembly for introducing streams of gaseous titanium tetrachloride and oxygen, or an oxygen containing gas into a reaction chamber in the presence of hot combustion gases to produce a pyrogenic titanium dioxide pigment the improvement comprising: a rotary body, a shaft constructed and arranged to rotatably support said rotary body in said reaction chamber, three elongated feed tubes arranged concentrically with respect to each other and to said rotary body with said shaft arranged to extend coaxially through the innermost of said three concentric tubes, said tubes being arranged to feed a plurality of said gases into said reaction chamber for reaction therein and contact with the exterior of said rotary body, cooling-means arranged to feed a coolant into the interior of said rotary body to cool the exterior thereof and drive-means connected to said shaft and arranged to rotate said rotary body at high speed.

2. In a tubular burner assembly according to the improvement of claim 1 wherein said rotay body comprises a hollow impervious nose and said shaft is also hollow, said cooling-means being arranged to feed a coolant into and from said hollow impervious nose via said hollow shaft.

3. In a tubular burner assembly according to the improvement of claim 1 wherein said rotary body comprises a truncated cone carried on the end of a shaft rotatably mounted in said burner assembly coaxial therewith and a cylindrical sleeve telescoped over and connected to said truncated cone, said cylindrical sleeve being arranged to form a ring-shaped reaction zone in said reaction chamber, said sleeve having radial apertures in the wall thereof above its connection with said truncated cone for discharging gaseous $TiCl_4$ from within said sleeve outwardly radially into said reaction zone.

4. In a tubular burner assembly according to claim 3 wherein said cooling means comprises a feed pipe arranged coaxially with said cylindrical sleeve and adapted to feed a coolant up into the open bottom end thereof.

References Cited

UNITED STATES PATENTS 2,703,275    3/1955    Elliott et al. _____ 23—284
2,491,324    12/1949    Maki _____ 431—168 X JAMES H. TAYMAN, Jr., Primary Examiner U.S. Cl. X.R.

23—277 R, 202 V; 431—3, 32, 121, 168, 187, 239—214, 25, 222.11, 223, 224, 132.3; 261—83